United States Patent [19]

Cunningham

[11] Patent Number: 5,350,253
[45] Date of Patent: Sep. 27, 1994

[54] METHOD FOR SUPPORTING DISTRIBUTION MEANS

[76] Inventor: John Cunningham, 35 Loughberry Rd., Saratoga Springs, N.Y. 12866

[21] Appl. No.: 36,660

[22] Filed: Mar. 24, 1993

[51] Int. Cl.$^5$ .............................................. F16L 1/00
[52] U.S. Cl. ...................................... 405/154; 248/49; 405/157; 405/158
[58] Field of Search ............... 405/154, 156, 157, 158; 248/49, 66, 70, 55

[56] References Cited

U.S. PATENT DOCUMENTS

| | | | |
|---|---|---|---|
| 1,861,436 | 6/1932 | Collins | 405/154 X |
| 3,115,726 | 12/1963 | Sayles | 405/154 X |
| 3,568,455 | 3/1971 | McLaughlin et al. | 405/154 |
| 3,853,182 | 12/1974 | Bourne et al. | 405/154 X |
| 4,140,292 | 2/1979 | Kaigler | 405/154 X |
| 4,946,128 | 8/1990 | Cunningham | 248/560 |
| 5,205,528 | 4/1993 | Cunningham | 248/602 |

*Primary Examiner*—Dennis L. Taylor
*Attorney, Agent, or Firm*—Porter, Wright, Morris & Arthur

[57] ABSTRACT

A method of supporting distribution means, such as a pipeline, that accommodates temperature-induced expansion or contraction of the distribution means as well as unexpected, infrequent shocks to the structure, and provides effective thermal isolation of the distribution means from the surface on which the structure rests. The method includes arranging laterally spaced apart fixed bearing supports on a surface adjacent a path for distribution means and supporting elongated elastic members on the bearing supports at a distance spaced inwardly from the ends of the elastic members. Distribution means may be placed in association with the elastic members. Beginning from an equilibrium state, each elastic member is capable of bending in proportion to the magnitude of an additional load applied intermediate the ends of the elastic member, with the ends of each member sliding against the bearing members a distance also proportional to the magnitude of the additional load.

19 Claims, 2 Drawing Sheets

METHOD FOR SUPPORTING DISTRIBUTION MEANS

BACKGROUND AND SUMMARY OF THE INVENTION

This present invention relates to a method for supporting distribution means, such as a pipeline or aqueduct. More particularly, the present invention relates to a homeostatic method for supporting distribution means that accommodates temperature-induced expansion or contraction of the distribution means, resists unexpected, infrequent shocks such as might be encountered during an earthquake or similar disaster, and provides effective thermal isolation of the distribution means from the surface on which the structure rests.

Conventional methods for supporting distribution means such as pipelines frequently are designed to use essentially rigid structures, i.e., the structures do not yield appreciably on the application of an external force. When an external force is applied to such a rigid structure, a variety of tensile, compressive and bending forces may be created within the structure. If the external force is sufficiently high, the method for supporting the distribution means may fail, resulting in rupture of the pipeline.

Release of the substances contained in a pipeline or other distribution means may result in disruption of the supply of such substances to users, for example, the supply of water to a municipal water system, fuel to a power plant, or feedstock chemicals to a manufacturing plant. Release of these substances also may result in other adverse effects, such as flooding, exposure of persons to thermally or physiologically harmful substances, or environmental contamination. To reduce the risk of such occurrences, existing methods for supporting distribution means frequently call for overdesign of at least some portions of these rigid supporting structures.

In addition, conventional methods for supporting distribution means generally are ineffective in minimizing undesirable thermal transfer from the distribution means to the supporting structure when the temperature of the material contained in the distribution means varies substantially from the ambient temperature. For example, oil being transported by pipeline through extremely cold regions must be kept warm to maintain flow in the pipeline; however, heat transferred from the pipeline to its supporting structure may in turn be transferred to the ground supporting the structure, resulting in undesirable melting of frozen matter adjacent the structure, including permafrost soil. Melting of the permafrost may lead to instability of the supporting structure in addition to adverse environmental consequences. In addition, melting of snow and ice produces water that accelerates corrosion of metal parts of the distribution means and its supporting structure.

The present invention provides a method for supporting a pipeline or other distribution means on a structure whose elements are in or tending toward a relatively stable state of equilibrium. "Homeostasis" is defined as "a relatively stable state of equilibrium or a tendency toward such a state between the different but interdependent elements or groups of elements of an organism or group" (Webster's New Collegiate Dictionary, G.&C. Merriam Co., 1976). Hence the method of the present invention may be referred to as a homeostatic method.

The present invention provides a method of supporting distribution means that includes arranging laterally spaced apart fixed bearing members on a surface adjacent a path for distribution means and supporting elongated elastic members on a bearing surface of the bearing members at a distance spaced inwardly from the ends of the elastic members. Each elastic member is capable of bending in proportion to the magnitude of a load applied intermediate its ends. Distribution means may be placed in association with the elastic members, each of which supports only the share of the distribution means which is acting directly above it. The method of the present invention establishes an equilibrium state between the bending elastic members and the weight of the distribution means.

Beginning from such an equilibrium state, an additional load applied intermediate the ends of the elastic members causes the midportion of each elastic member to bend from a first equilibrium position an amount proportional to the magnitude of the additional load and assume a second, more downwardly bowed position. The ends of the elastic members slide against the bearing members a distance also proportional to the magnitude of the additional load as the midportion bows downwardly. The movement of the elastic members establishes a new equilibrium state between the bending elastic members and the weight of the distribution means. When the additional load is removed, the midportions unbow, returning to substantially the same positions as their original equilibrium positions. The ends of the elastic members slide a corresponding distance in the opposite direction, also returning to substantially the same positions as their original equilibrium positions. The midportions of the elastic members bend and the ends of the elastic members slide in a similar manner in response to a force applied upwardly against the bottom of the elastic members or to a force applied against any of the bearing supports.

The bending and sliding of the elastic members in response to changes in the load supported by the structure may perform shock and energy absorbing functions when the elastic members engage the bearing surface. The absorbed energy is dissipated primarily in the form of heat generated by the frictional contact between the elastic members and the bearing surfaces. Preferably, the elastic members engage the bearing surface during bending from an external force at a homeostatic, or critical, angle, i.e., an angle within the range of about 25 to about 50 degrees from a vertical axis of support for the structure.

In the method of the present invention, the contact between the elastic members on which the distribution means is supported and the ground-engaging fixed bearing members is minimized, thereby reducing undesirable thermal transfer from the distribution means to the supporting structure and thence to the ground. In addition, the method of the present invention may include providing means for dissipating heat into the air more efficiently than conventional methods, because the heat dissipating means may be attached directly to elements of the supporting structure that are in contact with the distribution means.

DESCRIPTION OF PREFERRED EMBODIMENT(S)

Figure 1:
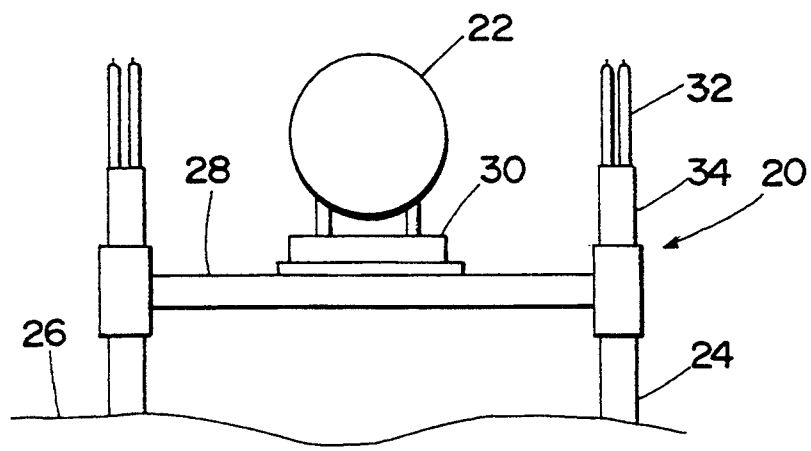
FIG. 1 is a sectional view of a structure for supporting a pipeline in accordance with conventional methods.

Referring now to the drawings, FIG. 1 shows a sectional view of a conventional structure 20 for supporting a pipeline 22. The structure 20 includes a pair of laterally spaced apart support members 24 which engage the ground or other surface 26. The support members 24 are rigidly joined by a cross-member 28 to which the pipeline 22 is secured by mounting means 30. Radiators 32 may be attached to the support members 24 adjacent to the pipeline 22 to dissipate heat from the pipeline contents. Insulation 34 may be provided between the radiators 32 and the bearing supports 24 to reduce thermal transfer therebetween.

Figure 2:
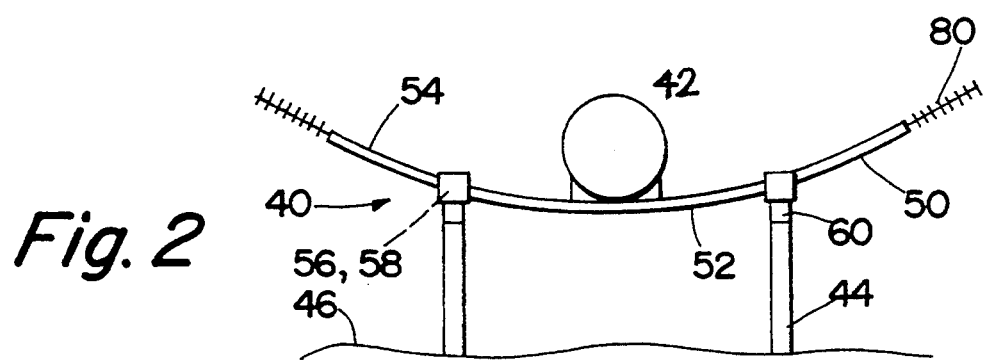
FIG. 2 is a sectional view of a structure for supporting distribution means in accordance with an embodiment of the method of the present invention.
Figure 3:
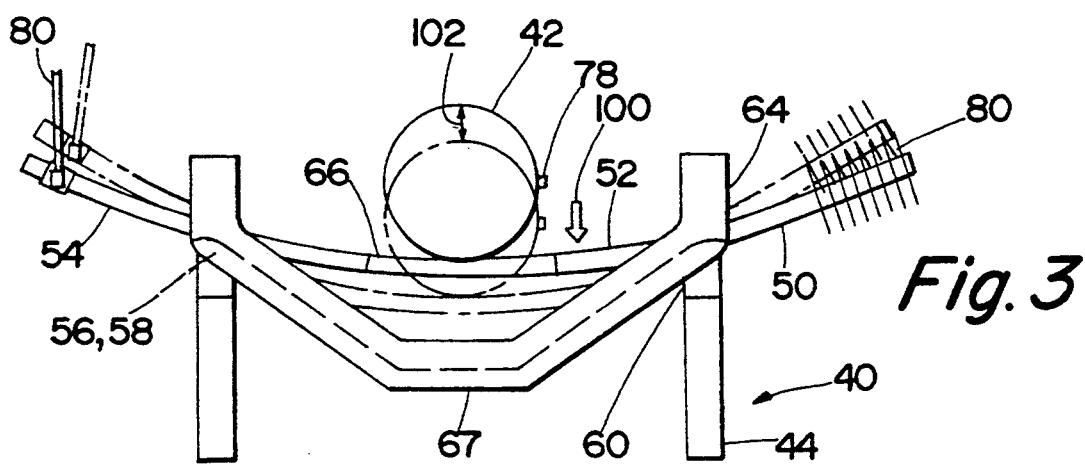
FIG. 3 is a sectional view of a structure for supporting distribution means in accordance with another embodiment of the method of the present invention.
Figure 6:
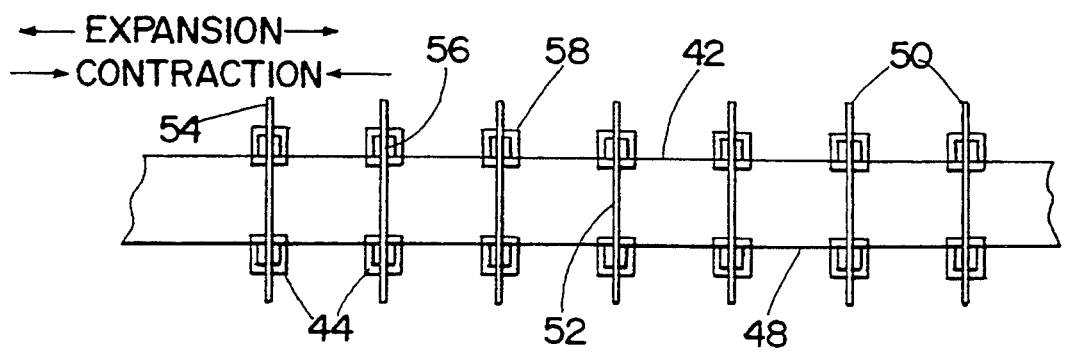
FIG. 6 is a top plan view of a structure for supporting distribution means in accordance with the method shown in FIG. 2.

FIGS. 2 and 3 show sectional views of structures 40 for supporting distribution means 42 in accordance with the method of the present invention. Laterally spaced apart fixed bearing supports 44 may be arranged on the ground or other surface 46 adjacent a path 48 for distribution means 42 as shown in FIG. 6. Each pair of bearing supports 44 may be located a predetermined distance along the path 48 from another pair of bearing supports 44. An elastic support member 50 may be arranged substantially perpendicular to the path 48 with a midportion 52 extending between a pair of bearing supports 44 and the end portions 54 extending longitudinally beyond the pair of bearing supports 44.

Each bearing support 44 may have disposed therein, preferably in a top portion 58, a bearing surface 56. The bearing surface 56 may engage an elastic member 50 at a distance spaced inwardly from one of its ends 54. Although the drawings show only one bearing surface 56 for each bearing support 44, more than one bearing surface 56 may be provided on a single bearing support 44. The bearing surface 56 may be angled downwardly toward the center of the structure 40 as shown by the heavy dotted line in FIG. 3. Insulating means 60 may be provided between the bearing surface 56 and the bearing supports 44.

The elastic member 50 preferably engages bearing surface 56 at a critical angle, i.e., an angle within the range of about 25 to about 50 degrees from a vertical axis of support for the structure. The critical angle permits the supporting structure optimally to absorb shock and energy, as described below. Angles outside of this range also may work and are included in the scope of this invention.

Figure 5:
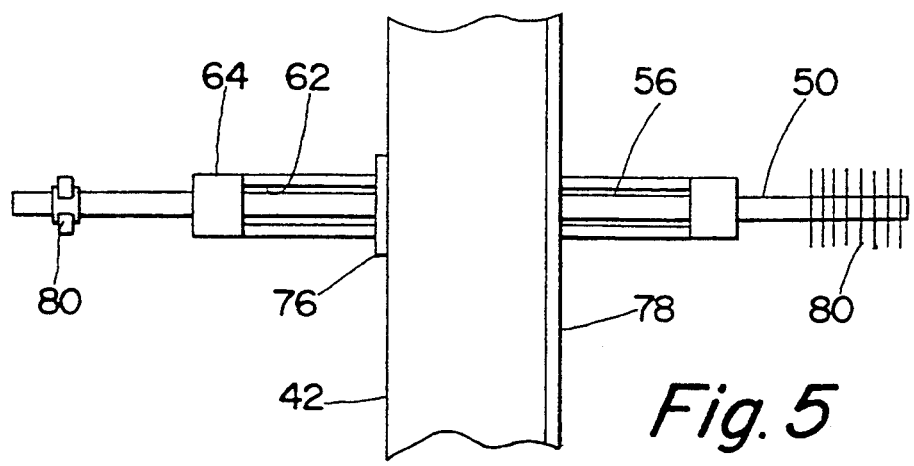
FIG. 5 is a top plan view of a portion of a structure for supporting distribution means in accordance with the method shown in FIG. 3.

The bearing surface 56 may comprise an open channel 62 as shown in FIG. 5. Guide caps 64 may overlay an elastic member 50 supported within the open channel 62, limiting the movement of the elastic member 50 therein to transverse sliding within the channel 62. The guide caps 64 for both bearing channels 62 associated with a single elastic member 50 may be a unitary structure 67 extending below the midportion 52 of the elastic member 50 as shown in FIG. 3. The unitary structure 67 may act as a safety device to limit the bending of the midportion 52 in the event of a sudden overwhelming force from above, thereby preventing rupture of, or other damage to, the distribution means 42. An optional safety bracket 90 may be secured (in any conventional manner, for example, by welding) to the top portion 58 of a bearing support 44 to inhibit upward movement of an elastic member 50 normal to the bearing surface 56, while permitting the transverse sliding motion of the elastic member 50, to prevent the elastic member 50 from disengaging the bearing surface 56 in the event of a violent external force applied to the structure 40.

The distribution means 42 may be secured to the elastic members 50, as shown in FIG. 2, in a manner described below. Alternatively, the distribution member 42 may be supported on the elastic members 50 directly or through an intervening insulating layer, such as an insulating sleeve 66 surrounding a midportion 52 of the elastic member 50. The distribution means 42 also may be supported by the elastic members 50 in a variety of other ways, including by welding or otherwise securing the members 50 directly onto midpoints of the distribution means 42.

Each of the elastic members 50 is capable of bending in proportion to the magnitude of a load applied to its midportion. When the distribution means 42 is overlaid on the midportions 52 of two or more elastic members 50, each of the elastic members 50 supports only the share of the distribution means 42 which is acting directly above it. The method of the present invention establishes an equilibrium state between the bending elastic members 50 and the weight of the distribution means 42, as shown in FIGS. 2 and 3.

Beginning from an equilibrium state, an additional load 100 applied intermediate the ends 54 of the elastic members 58 causes the midportion 52 of each elastic member 50 to bend from a first equilibrium position an amount proportional to the magnitude of the additional load 100 and assume a second, more downwardly bowed position as shown by the dotted lines in FIG. 3. The ends 54 of each of the elastic members 50 slide against the bearing surfaces 56 a distance also proportional to the magnitude of the additional load 100 as the midportion 52 bows downwardly. The movement of the elastic members 50 establishes a new equilibrium state between the bending elastic members 50 and the total applied load consisting of the weight of the distribution means 42 and the additional load 100. When the additional load 100 is removed, the midportions 52 unbow, returning to substantially the same positions as their original and slightly bowed equilibrium positions. The ends 54 of the elastic members 50 slide a corresponding distance in the opposite direction, also returning to substantially the same positions as their original equilibrium positions. In a similar manner, the midportions 52 of the elastic members 50 bow upwardly and the ends 54 of the elastic members 50 slide relative to the bearing surfaces 56 in response to a force applied upwardly against the bottom of the elastic members 50. Each of the ends 54 is capable of unique and distinct movement on its respective bearing surface 56 with respect to any of the other ends 54, in response to a bending of the midportions 52 or external forces applied to any of the bearing supports 44.

If an applied force does not result in displacement of any of the bearing supports 44, the distribution means 42 and its supporting structure 40 will return substantially to their original equilibrium positions with a minimum of oscillation. If any of the bearing supports 44 is deformed or lost, the distribution means 42 and its supporting structure 40 will reach a new equilibrium state, in which the displacement 102 of the distribution means 42 from its original position is proportional to the product of the number of elastic member ends 54 displaced and the total displacement of those ends 54, and inversely proportional to the number of elastic member ends 42 that remain supported by bearing supports 44. Stated another way, the total displacement 102 of the distribution means 42 from its original position generally will be some fraction of the total displacement of the ends 54, with the fractional numerator representing the number of ends 54 displaced and the fractional denominator representing the total number of support ends 54 in the system.

Applying this relationship, if one of the bearing supports 44 of the structure 40 shown in FIG. 3 were displaced downwardly, the downward displacement of the distribution means would be less than the downward displacement of the affected bearing support 44. If some, but not all, of the bearing supports 44 were displaced, the displacement of the distribution means 42 would be less than the displacement of the affected bearing supports 44.

Figure 7:
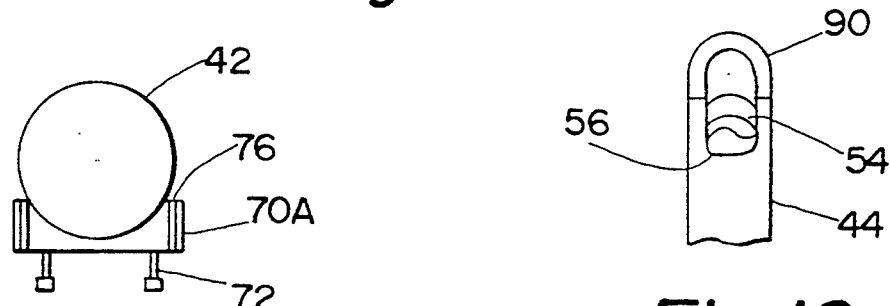
FIG. 7 is a sectional view of an embodiment of a bracket for stabilizing distribution means on a supporting structure in accordance with the method shown in FIG. 2.
Figure 10:
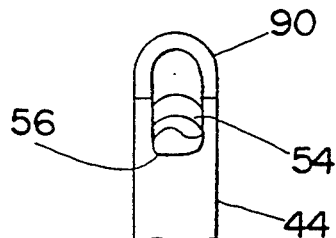
FIG. 10 is a sectional view of an optional safety bracket to prevent an elastic member from disengaging with the bearing surface.
Figure 8:
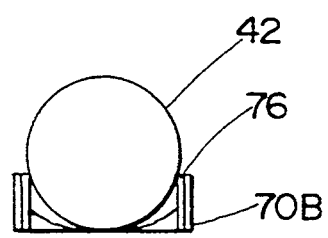
FIG. 8 is a sectional view of another embodiment of a bracket for stabilizing distribution means on a supporting structure in accordance with the method of the present invention.
Figure 9:
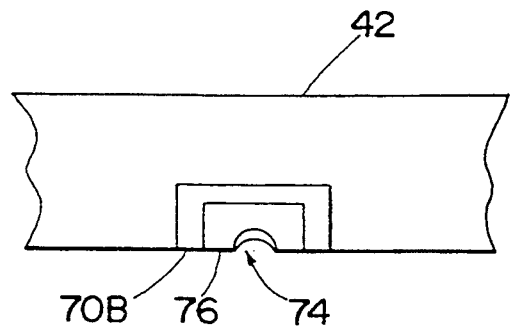
FIG. 9 is a side elevational view of a portion of a supporting structure for distribution means showing the bracket of FIG. 8.

The method of the present invention may include providing means for securing the distribution means 42 to the supporting structure 40, for example, to prevent the distribution means 42 from rolling off of the supporting structure 40 when the structure 40 crosses sloped terrain. FIG. 7 shows a pair of rigid brackets 70A attached to the distribution means 42, for example, by welding. The brackets 70A may be secured directly to an elastic member 50, for example, by bolts 72. Alternatively, brackets 70B may be provided with a notched or grooved surface 74, as shown in FIG. 9. The notched surface 74 may engage an elastic member 50, restricting movement along the long axis of the distribution means 42. However, the notched surface permits transverse motion and the dissipation of the energy associated therewith, as shown by the dotted lines in FIG. 8.

Figure 4:
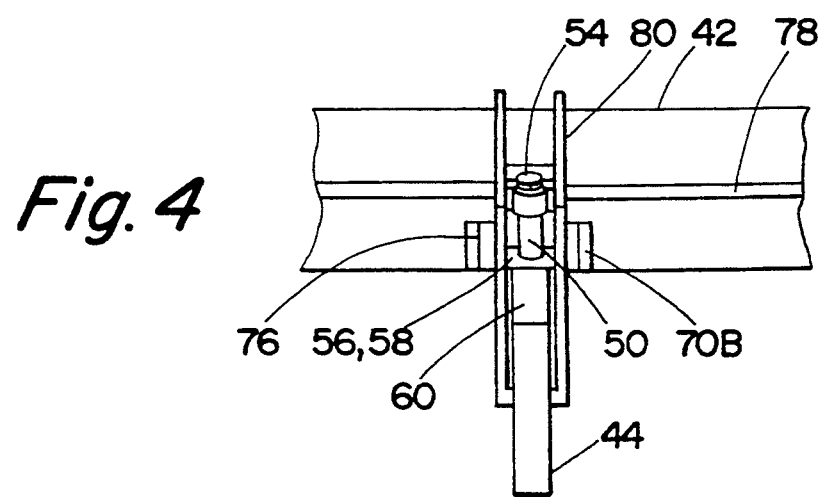
FIG. 4 is a side elevational view of a portion of a structure for supporting distribution means in accordance with the method shown in FIG. 3.

Brackets 70A and 70B may be provided with preferably zinc plates 76 adjacent the distribution member 42 constructed of metal to minimize corrosion which may result from securing the brackets 70 to the distribution member 42 as shown in FIGS. 4, 5, 7 and 8. A sacrificial zinc strap 78 may be attached to the outer surface of the distribution means 42 to provide additional corrosion protection, as shown in FIGS. 3–5. The zinc strap 78 may extend laterally along the length of the distribution means 42. Radiator means 80 may be provided on the end portions 54 of the elastic members 50 to dissipate the heat of the material being transported in the distribution means 42.

The above-described preferred embodiments should not be construed as limiting and are susceptible to modification by one skilled in the art. Such modification is considered to be within the spirit of the present invention and under the protection of the following claims. This invention is a pioneer invention deserving of a broad scope of coverage.

What is claimed is:

1. A method for supporting distribution means, comprising the following steps:

arranging at least one pair of laterally spaced apart fixed bearing supports on a surface adjacent a path for distribution means;

forming said bearing supports with a bearing surface for engaging an elongated member;

supporting at least one elongated elastic support member on at least one pair of said bearing supports;

arranging said elastic member substantially perpendicular to said path with a midportion of said elastic member extending between said pair of bearing supports and end portions of said elastic member extending longitudinally beyond said pair of bearing supports such that said bearing surfaces engage said elastic member at a distance spaced inwardly from said end portions;

selecting an elastic member capable of bending from an equilibrium position to assume a more downwardly bowed position when a load is applied to said midportion intermediate said pair of bearing supports;

resting said end portions of said elastic member on said pair of bearing supports to enable said end portions to slidably move relative to said bearing supports in response to a bending of said midportion or in response to movement of any of said bearing supports; and placing distribution means on said elastic member, said distribution means arranged substantially perpendicular to said elastic member.

2. The method of claim 1, further comprising the step of:

arranging said bearing surfaces to engage said elastic member at an angle within the range of about 25 to about 50 degrees from a vertical axis of each of said bearing supports.

3. The method of claim 1, wherein said bearing surface is provided with an open channel.

4. The method of claim 3, further comprising the step of:

providing a guide cap on said channel to maintain said elastic member within said channel.

5. The method of claim 1, wherein said distribution means is arranged to move transversely for a limited distance with respect to said elastic member.

6. The method of claim 1, further comprising the step of:

rigidly securing said distribution means to said elastic member.

7. The method of claim 1, further comprising the step of:

providing an insulating sleeve for said midportion of said elastic member.

8. The method of claim 1, further comprising the step of:

providing insulating means between said bearing supports and said bearing surfaces.

9. The method of claim 1, further comprising the step of:

providing radiator means on said ends of said elastic member.

10. A method for assembling a structure for supporting distribution means above a surface, said method comprising the steps of:

arranging a first pair of laterally spaced apart fixed bearing supports on a surface adjacent a path for distribution means;

forming said supports with a bearing surface for engaging a first elongated elastic member;

arranging a second pair of laterally spaced apart fixed bearing supports on said surface adjacent said path at a predetermined distance along said path from said first pair of bearing supports;

forming said supports of said second pair with a bearing surface for engaging a second elongated elastic member;

supporting said first elongated member on said first pair of bearing supports, said first elongated member arranged substantially perpendicular to said path, a midportion of said first elongated member extending between said first pair of bearing supports, and first and second end portions of said first elongated member extending longitudinally beyond said first pair of bearing supports such that said bearing surfaces engage said first elongated member at a distance spaced inwardly from said first and second end portions;

supporting said second elongated member on said second pair of bearing supports, said second elongated member arranged substantially perpendicular to said path, a midportion of said second elongated member extending between said second pair of bearing supports and left and right end portions extending longitudinally beyond said second pair of bearing supports such that said bearing surfaces of said second pair engage said second elongated member at a distance spaced inwardly from said left and right end portions.

selecting each of said first and second elongated members to be capable of bending from an equilibrium position to assume a more downwardly bowed position when a load is applied to their midportions; and resting said end portions of said elongated members on their respective bearing supports to enable said end portions to slidably move relative to their respective bearing supports in response to a bending of said midportions or in response to external forces applied to any of said bearing supports.

11. The method of claim 10, further comprising the step of:

placing distribution means in association with said first and second elongated members, said distribution means arranged substantially perpendicular to said elongated members.

12. The method of claim 10, further comprising the step of:

arranging said bearing surfaces to engage said elongated members at an angle within the range of about 25 to about 50 degrees from a vertical axis of each of said bearing supports.

13. The method of claim 10, wherein each of said bearing surfaces is provided with an open channel.

14. The method of claim 13, further comprising the step of:

providing guide caps on said channels to maintain said elongated members within said channels.

15. The method of claim 11, wherein said distribution means is arranged to be free to move transversely for a limited distance with respect to said elongated members.

16. The method of claim 11, further comprising the step of:

rigidly securing said distribution means to said elongated members.

17. The method of claim 10, further comprising the step of:

providing an insulating sleeve for said midportions of said elongated members.

18. The method of claim 10, further comprising the step of:

providing insulating means between said bearing supports and said bearing surfaces.

19. The method of claim 10, further comprising the step of:

providing radiator means on said ends of said elongated members.

* * * * *